Dec. 18, 1945. J. F. McKENNEY 2,391,256
ELECTRIC SWITCHING SYSTEM
Original Filed July 15, 1942 2 Sheets-Sheet 1
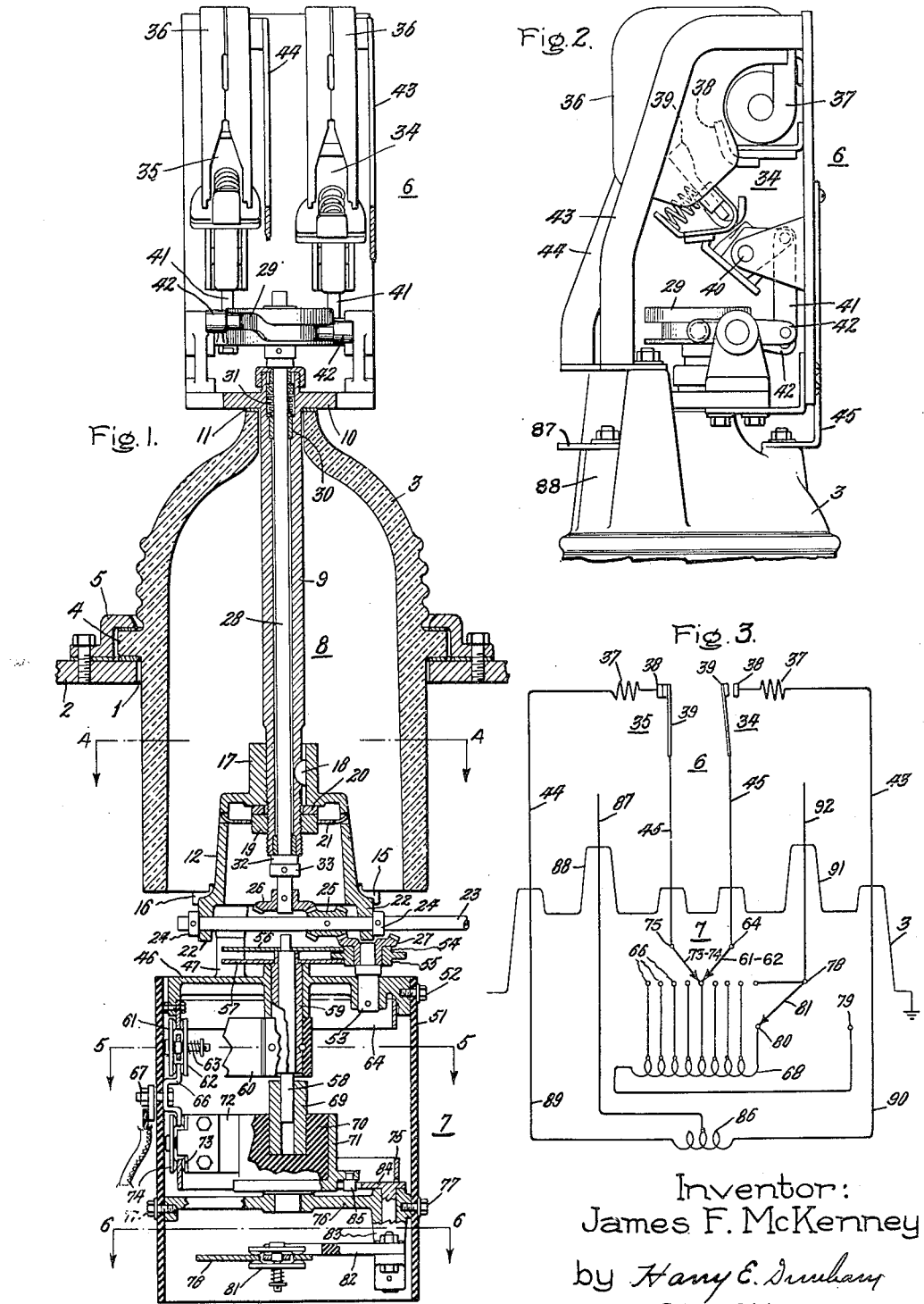
Inventor:
James F. McKenney,
by Harry E. Dunham
His Attorney.

Dec. 18, 1945.  J. F. McKENNEY  2,391,256
ELECTRIC SWITCHING SYSTEM
Original Filed July 15, 1942    2 Sheets—Sheet 2

Inventor:
James F. McKenney,
by Harry E. Dunham
His Attorney.

Patented Dec. 18, 1945

2,391,256

UNITED STATES PATENT OFFICE 2,391,256

ELECTRIC SWITCHING SYSTEM

James F. McKenney, Pittsfield, Mass., assignor to General Electric Company, a corporation of New York Original application July 15, 1942, Serial No. 450,977. Divided and this application March 10, 1943, Serial No. 478,728

3 Claims. (Cl. 171—119)

This invention relates to electric switching mechanisms and more particularly to improvements in the class of such mechanisms which are known as load-ratio-control mechanisms.

This is a division of my application Serial No. 450,977, filed July 15, 1942, now Patent No. 2,363,886 of November 28, 1944, and assigned to the present assignee. Claims involving electrical connections have been excluded from the parent case and are included herein.

Load-ratio-control mechanisms are employed primarily for changing taps on, and hence the ratio of, transformers while they are under load and without interrupting the load current. They are usually characterized by a pair of effectively parallel branch circuits which are alternately opened and closed so as to transfer the load current back and forth from one to the other, the tap changing always being done in an open branch circuit. They can also be used for tap changing on other kinds of apparatus, such as reactors, dynamo windings, capacitors, and even resistors.

The invention is an improved combination of an insulating bushing and load-ratio-control mechanism into a compact unitary structure in which a single bushing provides the major insulation to ground of all of the load-ratio-control switching mechanism.

An object of the invention is to provide a new and improved arrangement of the parts of a load-ratio-control mechanism.

Another object of the invention is to provide a compact and unitary load-ratio-control structure.

A further object of the invention is to provide a new combination of an insulating bushing and a load-ratio-control mechanism.

The invention will be better understood from the following description taken in connection with the accompanying drawings and its scope will be pointed out in the appended claims.

Figure 4:
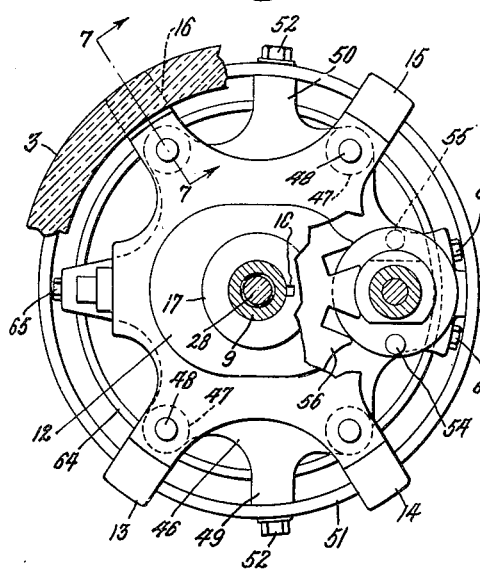
Figure 5:
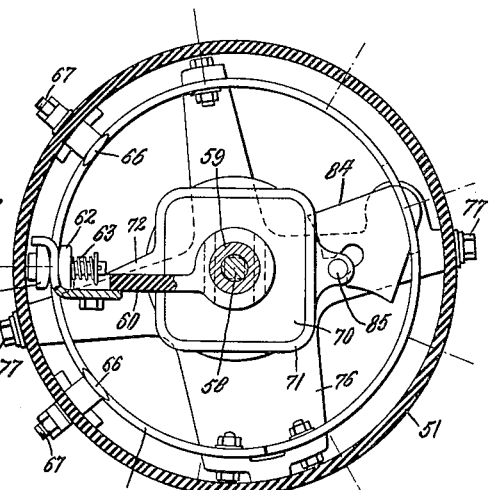
Figure 6:
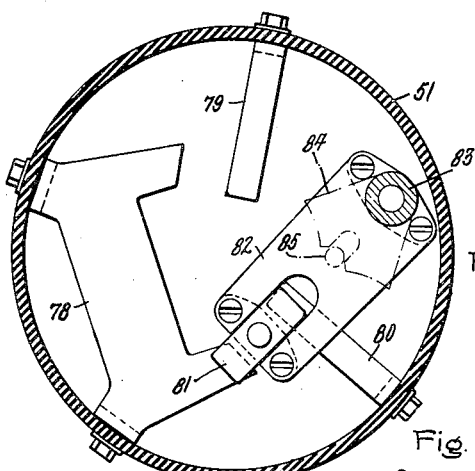
Figure 8:
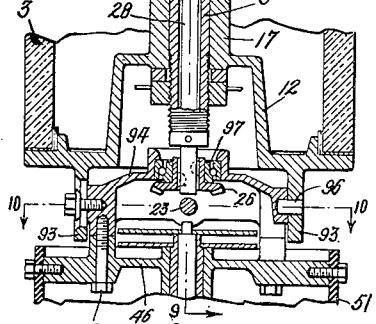
Figure 9:
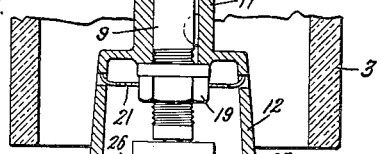
Figure 10:
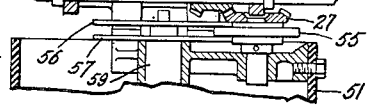
Figure 7:
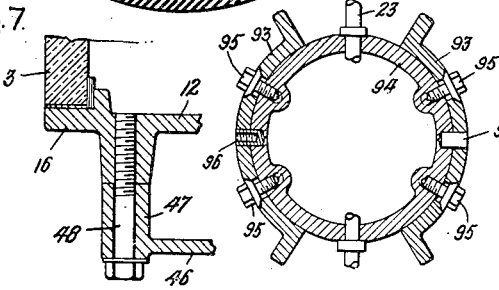

In the drawings, Fig. 1 is a front elevation partly in section of an embodiment of the invention; Fig. 2 is a side elevation of the upper part of Fig. 1 for showing the details of the arcing contactor portion of the mechanism; Fig. 3 is a circuit diagram; Fig. 4 is a section on the line 4—4 of Fig. 1; Fig. 5 is a section on the line 5—5 of Fig. 1; Fig. 6 is a section on the line 6—6 of Fig. 1; Fig. 7 is a part section on the line 7—7 of Fig. 4; Fig. 8 is a part sectional view of a modification; Fig. 9 is a section on the line 9—9 of Fig. 8; and Fig. 10 is a section on the line 10—10 of Fig. 8.

Referring now to the drawings, in which the same reference character designates the same part throughout the several views, and more particularly to Fig. 1, the entire mechanism is mounted in an opening 1 in a casing or tank, part of which is shown at 2. This casing will usually be a conventional metal transformer tank which in many, but not necessarily all, cases will be at least partially filled with insulating and cooling liquid, the level of which with respect to the parts may typically be such as to coincide with the line 4—4. The portion of the mechanism mounted within the opening 1 and extending on both sides of it is an insulating bushing 3 which may be made of any suitable material, for example, ceramic material, such as porcelain or vitreous material, such as glass. As shown, it is provided with supporting means in the form of a ridge 4 which is clamped to the casing 2 by any suitable clamping means, such as a ring 5 bolted on the tank 2. Interposed between the ridge and the ring are relatively soft gaskets and padding means for preventing direct metal-to-porcelain contact.

The arcing duty or current interrupting function of the mechanism is performed by a set of contactors indicated generally by 6 and located on top of the bushing 3, whereas the actual tap-changing or selective switching is carried out by means of ratio adjusting selector switching mechanism indicated generally by 7 and located at the bottom of the bushing 3.

The arcing duty switches and the selector switches are both fastened to the bushing 3 by means of a clamping structure indicated generally by the reference numeral 18 and located within and lengthwise of the bushing 3. This clamping structure comprises a metal tube 9 having an integral transverse plate 10 at the top end thereof. The tube passes through an opening in the top of the bushing, and the bottom side of the plate 10 is separated from the top of the bushing by a gasket 11. Attached to the lower end of the tube 9 is a spider assembly 12 having four feet 13, 14, 15 and 16 which engage the under side of the bushing. These are shown more clearly in Figs. 4 and 7. The spider assembly 12 is provided with a boss 17 which is fastened by means of a key and keyway 18 to the lower end of the tube 9 and these parts are further fastened together by means of a nut 19 threaded on the lower end of the tube 9. A spring washer 20 is interposed between the lower side of the boss 17 and the nut 19 so that when the nut is drawn up, the spring washer is compressed not quite to its solid height, thereby putting the bushing 3 under compression. A locking plate 21 is fitted over the nut 19 and has fingers extending in side openings in the spider member 12 so as positively to prevent the nut 19 from loosening. Thus, the porcelain is pinched between the ends of the clamping means, namely the plate 10 and the feet 13—16, inclusive, and is subjected to a compressive force determined by the elasticity of the spring washer 20, which force will vary slightly with temperature changes as the difference in expansion between the metal tube 9 and the porcelain will be very slight. This precompression helps the porcelain resist bending loads which will occur during shipment due to the overhanging masses of the contactor mechanism 6 and the ratio adjuster mechanism 7. Before any tensile stress will appear in the porcelain the precompression must first be subtracted. This will subtantially lower the resutant tensile stress, and as porcelain is strong in compression and weak in tension, this feature materially strengthens the bushing.

The lower end of the spider member 12 is also provided with brackets 22 for receiving a drive shaft 23 which is held in place by means of thrust collars 24 and which carries between the two brackets 22 a double-ended bevel pinion 25 which drives two bevel gears 26 and 27, the former serving to operate the contactor mechanism 6 and the other to operate the ratio adjusting mechanism 7. The bevel gear 26 is pinned to the lower end of a cam shaft 28, running through the tube 9 of the clamping assembly, which has its upper end fastened to a scroll cam 29. The shaft 28 is journaled in bushings 30 fitted in the ends of the tube 9, and a spring loaded packing at the upper end of shaft 28 provides a seal around the shaft.

The contactor assemby 6 comprises a pair of air break arcing contacts 34 and 35, each of which has its own arc chute 36 and its own magnetic blow-out coil 37. Each contactor has a fixed contact 38 and a movable contact 39, the latter being pivoted at 40 and being operated by a link 41 attached to a pivoted cam follower 42. The fixed contacts 38 are connected in series with their blow-out coils 37 and are then connected by means of relatively rigid metallic connectors 43 and 44 to terminals on the bushing 3. These connectors also serve to brace the contactor assembly mechanically so as to make the mounting stronger and more rigid. The movable contacts are connected by means of similar connectors 45 to other terminals on the bushing 3.

The configuration of the scroll cam 29 is such that one contactor is opened and closed during one half revolution of the cam and the other contactor is opened and then closed during the next half revolution of the cam.

The ratio adjusting mechanism 7 is carried from the spider member 12 by means of a shelf member 46 having four upwardly extending portions 47 through which bolts 48 are threaded into the four legs of the spider member 12. The member 46 is in turn provided with a plurality of outwardly extending fingers 49 and 50 over which is fitted an insulating cylinder 51 which is fastened to these extensions by means of bolts 52. This cylinder is preferably made of resin-bonded laminated insulating material when the mechanism is immersed in cooling and insulating liquid. However, with air-cooled apparatus the cylinder should be made of glass or other non-moisture absorbing insulating material.

Fitted into the member 46 is an upwardly extending shaft 53 for the bevel gear 27. This bevel gear carries a pair of Geneva gear drivers 54 and 55 which cooperate respectively with Geneva gears 56 and 57 respectively on a solid shaft 58 and a hollow concentrically-mounted shaft 59. Fastened to the hollow shaft 59 is a contact-carrying arm 60. The outer end of this arm carries a pair of separable double-ended contacts 61 and 62 which are urged toward each other by a spring 63. The upper ends of these contacts engage continuously the opposite sides of a conducting ring 64 fastened to the member 46 by bolts 65. This serves as the common contact of the upper one of the two ratio adjusting switches. The lower ends of the contacts 61 and 62 serve to pass on opposite sides of and make contact with spaced fixed contacts 66 bolted at equally spaced intervals around the circumference of the cylinder 51. These are provided with external binding posts 67 for making electrical connection to taps in a transformer winding 68.

The solid shaft 58 which passes through the hollow shaft 59 carries a sleeve 69 which is slidable thereon but restrained from relative turning and which is embedded in a resinous insulating compound 70 in a square-cup-shaped member 71 integrally attached to which is a contact-carrying arm 72 carrying a set of spring-pressed contacts 73 and 74 which are similar to the contacts 61 and 62. These contacts continuously engage a second conducting ring 75 carried on a supporting member or shelf 76 which is bolted to the cylinder 51 by bolts 77. Contacts 73 and 74 also engage successively the spaced contacts 66 as the shaft 58 is rotated.

The Geneva gear drives for the ratio adjuster contact-carrying arms 60 and 72 are so adjusted that the arm 60 can move its contacts from one fixed tap contact 66 to the next only when the arcing contactor 34 is open and similarly the ratio adjuster arm 72 can only move its contacts from one fixed tap contact 66 to the next when the arcing contactor 35 is open. The arcing contactor 34 is connected in series with the ratio adjuster contacts 61—62 and the arcing contactor 35 is connected in series with the ratio adjuster contacts 73—74, as shown in Fig. 3, so that as as a result of this operation of the contacts and these connections it is impossible for a ratio adjuster switch ever to interrupt current or cause an arc in the insulating and cooling liquid in the transformer tank.

For extending the range or number of steps obtainable with the mechanism it is provided with a reversing or transfer switch consisting of a common contact 78 and a pair of additional contacts 79 and 80, all three of which are bolted to the insulating cylinder 51, as shown more clearly in Fig. 6. Selective bridging connection between the common contact 78 and either one of the other two contacts is made by a movable split contact arrangement 81 which is essentially of the same construction as the contacts carried by the ratio adjuster arms 60 and 72. This contact assembly 81 is carried by an insulating arm 82 pivotally mounted on a bracket 83 extending downwardly from the spider member 76. Integrally fastened to the arm 82 is a Geneva gear sector 84 which is operated by a pin 85 carried by the member 71. This arrangement is such that the ratio adjuster arm 72 can make substantially one complete revolution in one direction and thereby make successive engagement to all of the tap contacts 66 before the pin 85 will engage the sector 40. Further revolution of the ratio adjuster will cause the bridging contact 81 of the reversing switch to move to its other bridging position.

The circuit with which the above-described mechanism co-operates usually includes a mid-tapped reactor 86 for preventing short circuits between adjacent taps in the main transformer winding 68 when the ratio adjusters 60 and 72 make connection to such adjacent taps.

The preferred circuit arrangement is shown in Fig. 3. These connections may be traced from one line terminal 87 through an opening or sub-bushing 88 on the main bushing 3 to the electrical mid-point of the reactor 86. The circuit then divides through a pair of conductors 89 and 90 and the connectors 44 and 43 and the blow-out coils 37 and the arcing contactors 35 and 34 and the ratio adjuster contacts 73—74 and 61—62 to one of the tap contacts 66 of the main transformer winding 68, then through this winding to the contact 80 of the reversing switch and through the bridging contact 81 to the common contact 78 and then through anoher opening or sub-bushing 91 in the main bushing to the other line terminal 92. The arcing contactor 34 is shown open so that the ratio adjuster 60—61—62 may safely be moved to either one of the adjacent tap contacts without causing any arcing. Subsequent closure of the arcing contactor 34 will then change the voltage of the line terminal 87 to a voltage midway between the voltages of the adjacent taps to which the ratio adjusters make contact. In this manner taps on the main winding 68 are changed step by step without at any time interrupting the main circuit.

It will be noted that the above-described construction insures that the major insulation to ground of all of the parts of the ratio adjuster is the porcelain insulating bushing 3 and that as all of the circuit connections are brought out through this bushing no other insulating bushings are required.

Another feature of the invention is the cooling effect produced by the insulating cylinder 51. Thus, any heating of the ratio adjuster contacts caused by the flow of heavy currents therethrough will heat the surrounding liquid which, being confined in the cylinder 51, will rise as a result of this heating, thereby drawing cooling liquid in at the bottom of the cylinder so that a flue effect is produced resulting in circulation of the cooling liquid and thus causing a cooling action of the ratio adjuster contacts.

Still another feature of the invention is that the ratio adjuster switches are located in the same tank with the main transformer while the arcing contacts are placed outside in the air where they are readily accessible for contact replacement and where they will tend to have a relatively long contact life. This tendency to increase the contact life and the ready accessibility of the arcing parts which ordinarily need most frequent attention and replacement tends to permit much more frequent operation of the ratio adjuster mechanism so that in some cases time delay in the control of the device may be dispensed with, thus making a regulating transformer having this ratio adjusting mechanism substantially as quick acting as an induction voltage regulator.

The mechanism shown in Fig. 1 is suitable for varying the ratio of a single-phase transformer under load and it is also suitable for varying the ratio of one phase of a polyphase transformer. When changing the ratio of a polyphase transformer there will be employed as many mechanisms of the type shown in Fig. 1 as there are phases. In such cases it is convenient to drive all of the ratio adjusting mechanisms by means of a single motor or other suitable source of rotation and to that end the shafts 23 of the mechanisms will be mechanically coupled together. The simplest way to do this is to have all of the shafts in alignment so that they may be mechanically interconnected by simple insulating couplings. However, by reason of manufacturing variations in the dimensions of the various parts and notably variations in the dimensions of the insulating bushing 3, it is practically impossible to manufacture a number of units such as shown in Fig. 1 to such close tolerances that all of their shafts 23 will line up.

These variations in dimensions may be compensated for by the adjusting means of a modified structure, three views of which are shown in Figs. 8, 9 and 10. This consists of the elimination of the depending bracekts 22 on the member 12 and the substitution therefor of depending brackets 93 in which there is adjustably positionable a member 94 to which the spider 46 is fastened by the studs 48. The shaft 23 is journaled in the member 94. The member 94 is fastened to the depending bracekts 93 by means of studs 95 which are threaded into the member 94 and which pass through vertical slots in the brackets 93. Thus, by loosening the studs 95 the member 94 may be slid up and down vertically so as to secure the proper spacing of the shaft 23 with respect to the surface 2 of the transformer tank upon which the bushing 3 is supported. The studs 95 are then drawn up tight and as a further assurance against subsequent misalignment holes may be drilled through both the members 93 and 94 and dowels 96 inserted therein.

The gear 26 on the shaft 9 is keyed thereto and is provided with a ball bearing 97 mounted in the member 94. By means of this construction the gear 96 will slide up and down on the shaft 9 so as to accommodate vertical adjustment of the member 94.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a transformer tank containing a multi-tapped transformer winding and a mid-tapped switching reactor, a single insulating bushing mounted in an opening in said tank, load-ratio-control switching means mounted on said bushing, interconnections between said taps, said switches and said reactor, external connections for said winding, and means including spaced openings in said bushing for insulating all of said connections where they pass from the inside to the outside of said tank.

2. In a load-ratio-control system, a pair of non-arcing duty ratio adjusting selector switches, a pair of arcing duty contactors, a reactor one half of which is connected in series with one of said switches and at least one of said contactors and the other half of which is connected in series with the other of said switches and at least the other of said contactors, and a single ceramic bushing for providing the major insulation to ground for said switches and contactors.

3. In a load-ratio-control mechanism, a single insulating bushing for mounting in an opening in an insulating and cooling-fluid-containing transformer tank, a pair of non-arcing duty ratio adjuster switches carried by the inner end of said bushing under the surface of said liquid, a pair of air break arcing contactors carried by the outer end of said bushing, a reactor one half of which is connected in series with one of said ratio adjuster switches and at least one of said arcing contactors and the other half of which is connected in series with the other of said ratio adjuster switches and at least the other of said arcing contactors, and common operating means for said switch and contactors extending lengthwise through said bushing.

JAMES F. McKENNEY.